Feb. 7, 1933.  J. THOMAS  1,896,648
DISH STERILIZER
Filed Aug. 6, 1931
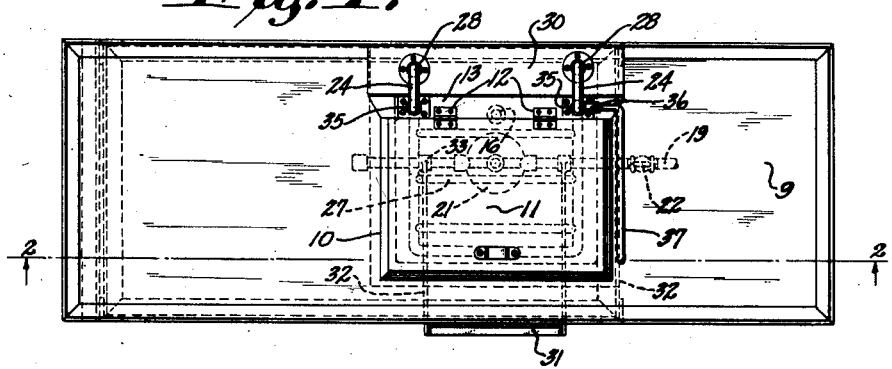
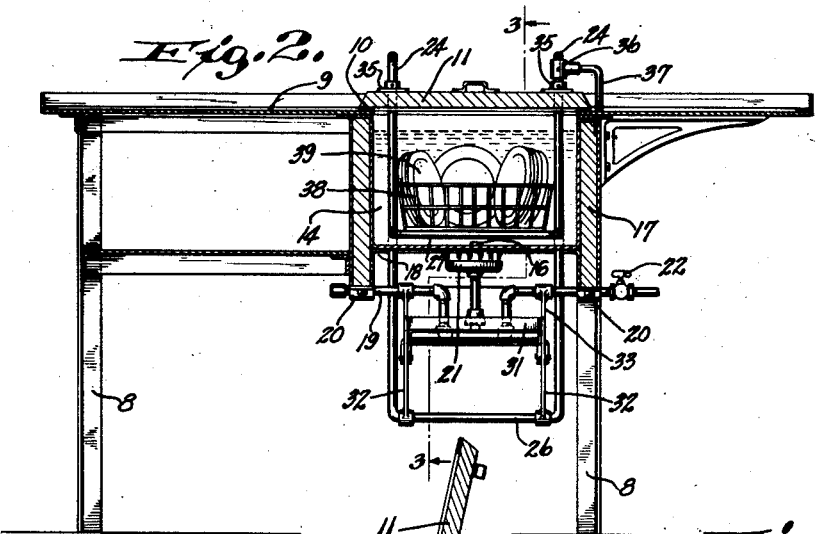
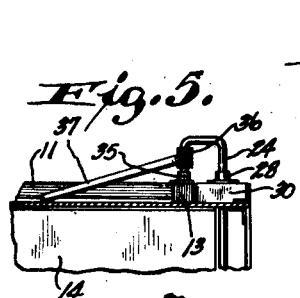
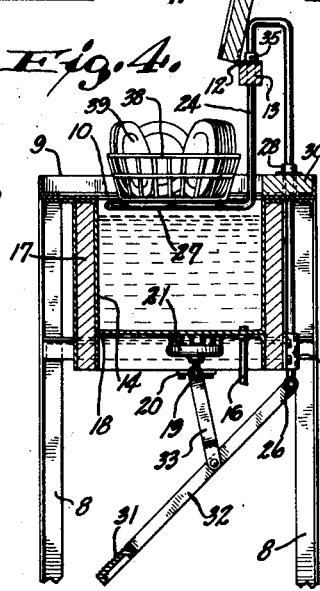
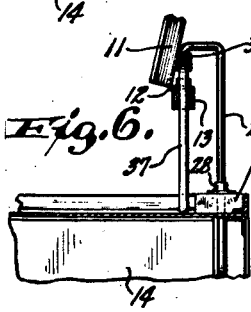
INVENTOR
John Thomas,
BY Morsell & Morsell
ATTORNEYS Patented Feb. 7, 1933

1,896,648

UNITED STATES PATENT OFFICE

JOHN THOMAS, OF MILWAUKEE, WISCONSIN

DISH STERILIZER

Application filed August 6, 1931. Serial No. 555,443.

This invention relates to improvements in dish sterilizers, particularly adapted for small restaurant and household use where it is essential or desirable to sterilize dishes after the same have been washed by immersing the dishes for a suitable period in boiling water.

One of the objects of the present invention is to provide a relatively small, compact dish sterilizer of relatively inexpensive construction which will occupy a minimum amount of space adjacent a sink, which will perform the sterilizing operations quickly and efficiently, and which is easy and convenient to operate.

A further object of the invention is to provide a dish sterilizer wherein provision is made for supplying to and withdrawing from a tank water or other liquid, means also being provided for heating the liquid to the desired sterilizing temperature and so maintaining it, and provision also being made for enabling the sterilized articles to be raised to a suitable accessible position, as well as the cover for the sterilizing tank, by foot power, whereby the hands of the operator are free to handle and manipulate the dishes or articles.

A further object of the invention is to provide a dish sterilizer having means for simultaneously raising the dish carrying basket and the tank cover, as well as simultaneously operating an instrumentality for releasably holding the cover and basket in elevated positions.

A further object of the invention is to provide a dish sterilizer which is of very simple construction, is strong and durable, and is well adapted for the purposes set forth.

With the above and other objects in view, the invention consists of the improved dish sterilizer, and its parts and combinations as set forth in the claims, and all equivalents thereof.

In the accompanying drawing in which the same reference characters indicate the same parts in all of the views:

Fig. 1 is a plan view of the improved dish sterilizer;

Fig. 2 is a longitudinal vertical sectional view thereof taken on line 2—2 of Fig. 1;

Fig. 3 is a transverse vertical sectional view taken on line 3—3 of Fig. 2;

Fig. 4 is a view similar to Fig. 3 showing the basket elevated and the tank cover raised and opened by means of depression of the foot treadle;

Fig. 5 is a fragmentary transverse vertical sectional view showing the tank cover in lowered closed position and also the inoperative position of the cover holding means; and Fig. 6 is a view similar to Fig. 5 only showing the cover elevated and opened and cover holding means in its operative retaining position.

Referring more particularly to the drawing it will appear that the sterilizer includes a supporting stand formed of spaced apart supporting legs 8 carrying a horizontal top member 9. Said top is provided with a rectangular opening 10 therein, which is controlled by a cover or closure 11. The inner edge portion of said cover is connected by means of hinges 12 with a vertically slidable block 13, the mounting of which will hereinafter be described more in detail. In its lowered position said block 13, as well as the cover 11, seat so as to close the rectangular opening 10.

A metallic sterilizing tank 14 having a laterally disposed surrounding shoulder at the upper edge thereof is positioned below said opening 10 and secured to the under surface of the table top 9 by means of the aforesaid shoulder in any suitable manner such as welding or riveting. An insulating box 17, preferably of wood, surrounds the sterilizing tank 14 and extends somewhat below the bottom thereof. A flanged tank supporting frame 18 is secured to the inner lower edge portion of said box 17 and is adapted to serve as an additional load supporting means. A drain pipe 16 extending through the bottom of the sterilizing tank, preferably a corner thereof, leads to any convenient point of discharge.

Below the table top and parallel thereto extends a gas main 19 supported by means of straps 20 from the bottom edge of the insulating box. A burner 21, communicating with the gas main 19, is positioned below and in close proximity to the sterilizing tank bottom and is controlled by a gas cock 22 in the gas main 19.

A tray receiving frame consisting of a pair of spaced apart inverted U-shape side bars 24 joined together at their lower extremities by a cross bar 26, has a leg of each of the side bars bent outwardly at a point medially of its length and at right angles. These laterally disposed portions, together with a series of joining cross-pieces form a tray support 27. The tray support 27 is adapted to fit into the sterilizing tank while the other pair of legs of the U-frame is adapted to engage two pairs of alining bearings 28 and 29, the first of which are located in a block 30 directly behind and adjacent to the slidable block 13 in its lowered position, while the latter are below the alining bearings 28 and in alinement therewith and secured to the insulating box 17.

There is further provided a treadle mechanism which consists of a laterally extending foot pedal 31, a pair of spaced apart side bars 32 extending from said pedal 31 to the cross bar 26 and journalled thereto, and a pair of depending links 33. Said links are loosely mounted at their upper ends on the gas main 19, and the lower ends of said links are bifurcated to straddle medial portions of the side bars 32 and are pivotally secured thereto to form fulcrums for said side bars or levers 32.

The slidable block 13 has extended therethrough portions of the U side bars of frame 24 and is secured thereto by means of set collars 35. One of the side bars at a point above the set collar 35 carries a bearing supporting collar 36 having a laterally disposed lug with an opening therein adapted to receive and pivotally carry an L-shaped extension prop or lock bar 37.

In operating the device the operator steps on the foot pedal which lifts, through elevation of the U-bars 24, the block 13 and the cover 11. As the cover rises to its extended position, the extension lock bar 37 slides along the table top until the bar is in a vertical position. In that position the members 34 are held in extended or elevated position by means of the lock or prop bar resting on the table top, and this will permit the operator to withdraw his foot from the treadle. The cover, if not previously thrown back is now lifted back in its out of the way position as shown in Fig. 4.

A tray or basket 38 loaded with soiled dishes 39 which are normally found on the table portion of the device, is placed on the tray support and lowered into the tank. To lower the tray the operator places his foot on the treadle and pulls the lock extension bar forward thereby disengaging said lock, and the pressure on the pedal is slowly withdrawn until the block 13 comes into contact with the table top. The cover 11 is then brought forward horizontally to close the opening, and the device is ready to operate as a sterilizer. The water in the sterilizing tank is kept at a suitable sterilizing temperature by means of the gas burner, and minor adjustments of the flame as well as the supply of the gas are controlled by the gas cock 22. Water may be discharged from the tank at any time through the discharge pipe 16 and may be readily replenished.

From the foregoing description, it will be seen that the improved dish sterilizer is both simple and novel, and is well adapted for the purposes set forth.

What is claimed as the invention is:

1. In a sterilizer, an open tank, a vertically movable carriage having a portion thereof extended into the tank, a tray carried by said carriage portion, a cover for controlling the open end of said tank hingedly connected to said carriage, and means for moving said carriage vertically with respect to said tank.

2. In a sterilizer, an open tank, a vertically movable carriage associated with said tank and having a portion thereof extended into the tank, a tray carried by said carriage portion, a cover for controlling the open end of said tank hingedly connected to said carriage, a treadle, and connections between said treadle and the carriage for moving the same.

3. In a dish and utensil sterilizer, a supporting frame, a tank mounted therein and having an open upper end, a rigid carriage vertically movably mounted in said frame and having a portion extending into said tank, a tray carried by said carriage portion, a cover for the open end of the tank hingedly connected with said carriage, a treadle, and mechanism between the treadle and carriage for imparting vertical movements to the carriage.

4. In a dish and utensil sterilizer, a supporting frame, a tank mounted therein and having an open upper end, a rigid carriage vertically movably mounted in said frame and having a portion extending into said tank, a tray carried by said carriage portion, a block carried fast by another portion of said carriage, a cover hingedly connected at one edge to said block and adapted to control the open end of the tank, a treadle, and mechanism between the treadle and carriage for moving the latter vertically with respect to the tank.

5. In a dish and utensil sterilizer, a supporting frame, a tank mounted therein and having an open upper end, a rigid carriage vertically movably mounted in said frame and having a portion extending into said tank, a tray carried by said carriage portion, a block carried fast by another portion of said carriage, a cover hingedly connected at one edge to said block and adapted to control the open end of the tank, a treadle, mechanism between the treadle and carriage for moving the latter vertically with respect to the tank, and a rod pivotally connected at one end to said carriage and having its free end engageable with the supporting frame to releasably maintain the carriage and members carried thereby in an elevated position upon actuation of the treadle.

In testimony whereof, I affix my signature.

JOHN THOMAS.